United States Patent
Rockett et al.

(10) Patent No.: US 7,355,510 B2
(45) Date of Patent: Apr. 8, 2008

(54) TELEMATICS SYSTEM VEHICLE TRACKING

(75) Inventors: David W. Rockett, Lake Orion, MI (US); Andrea K. Suurmeyer, Farmington Hills, MI (US); Sateesh Kavi, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 520 days.

(21) Appl. No.: 10/963,342

(22) Filed: Oct. 12, 2004

(65) Prior Publication Data

US 2006/0082471 A1  Apr. 20, 2006

(51) Int. Cl.
*B60R 25/10* (2006.01)
*G08B 1/08* (2006.01)
*G08G 1/123* (2006.01)
*H04Q 7/20* (2006.01)
*G01C 21/00* (2006.01)

(52) U.S. Cl. .............. 340/426.19; 340/426.1; 340/427; 340/539.13; 340/988; 340/995.1; 340/995.19; 455/456.1; 455/456.2; 455/456.3; 455/456.4; 455/456.5; 455/456.6; 455/457; 701/45; 701/213; 701/214; 701/215; 701/300; 701/301; 701/302

(58) Field of Classification Search ............ 340/426.1, 340/426.19, 427, 988, 539.13, 995.1; 455/456.1, 455/456.2, 457, 456.3, 456.5, 456.6; 701/45, 701/213–226, 300
See application file for complete search history.

(56) References Cited

U.S. PATENT DOCUMENTS

| | | | | |
|---|---|---|---|---|
| 4,908,629 A * | 3/1990 | Apsell et al. | ............... | 342/457 |
| 5,661,473 A * | 8/1997 | Paschal | ................. | 340/825.36 |
| 5,895,436 A * | 4/1999 | Savoie et al. | ............... | 701/214 |
| 6,298,306 B1 * | 10/2001 | Suarez et al. | ............... | 701/213 |
| 6,700,493 B1 * | 3/2004 | Robinson | ................. | 340/573.1 |
| 6,876,858 B1 * | 4/2005 | Duvall et al. | ............ | 455/456.1 |
| 6,917,306 B2 * | 7/2005 | Lilja | ......................... | 340/903 |
| 7,038,584 B2 * | 5/2006 | Carter | .................... | 340/539.13 |
| 7,049,942 B2 * | 5/2006 | Gallovich | ................ | 340/426.1 |
| 2005/0285721 A1 * | 12/2005 | Bucholz et al. | .......... | 340/426.1 |

* cited by examiner

*Primary Examiner*—Benjamin C. Lee
*Assistant Examiner*—Lam Pham

(57) ABSTRACT

A method of tracking a vehicle including receiving vehicle information at a call center from a telematics unit via a wireless network, determining whether the vehicle information is associated with a vehicle station identification for a missing vehicle on a vehicle tracking list and initiating vehicle tracking based on the determination.

23 Claims, 5 Drawing Sheets

TELEMATICS SYSTEM VEHICLE TRACKING

FIELD OF THE INVENTION

This invention relates generally to a telematic system vehicle tracking method. In particular, the invention relates to a method, system and computer usable medium for initiating tracking of a missing mobile vehicle based on matching vehicle information to information on a vehicle tracking list.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions may be accessed through a voice portal that uses incoming number identification to generate location information based on the area code or prefix of the phone number, or to access location information stored in a user's profile associated with the phone number. Users may be prompted to enter more details through a voice interface. Other examples are web and wireless portals that offer location-based services such as maps and driving directions where the user enters both a start and end addresses. Some of these services may have a voice interface.

A telematics tracking system currently tries to track missing or stolen vehicles that have an installed telematics unit by obtaining missing vehicle data from the telematics unit. The telematics units of unsold vehicles are occasionally not configured, as configuration is often performed during or shortly after a vehicle sale. If the telematics unit of the missing vehicle is unconfigured, the telematics tracking system attempts to configure the telematics unit if attempting to locate the vehicle. However, if the missing vehicle has not been turned on recently, for example, in the last 24 or 48 hours, the configuration attempt fails and the telematics tracking system cannot obtain vehicle information. Information from missing vehicles with configured telematics units is not accessible if the telematics unit is off, incorrectly configured, or if the missing vehicle is out of the cellular area. The telematics tracking system can continue to make periodic attempts to retrieve information from the missing vehicle.

It is desirable, therefore, to increase the opportunities to track a missing vehicle with an installed telematics unit. It is desirable to provide a method, system and computer usable medium that will notify the tracking team if the telematics unit in a missing vehicle initiates a vehicle data upload request or a service request. It is further desirable to provide request-vehicle data, such as vehicle station identification, GPS data, vehicle color, model type and year to the vehicle tracking system within, a predetermined period of time, such as five minutes, of the vehicle data upload request or the service request to increase the probability of locating the vehicle. An increased probability of locating the vehicle may decrease insurance costs for dealerships and vehicle owners.

SUMMARY OF THE INVENTION

One aspect of the present invention provides a method of tracking a vehicle including receiving vehicle information at a call center from a telematics unit via a wireless network, determining whether the vehicle information is associated with a vehicle station identification for a missing vehicle on a vehicle tracking list and initiating vehicle tracking based on the determination.

Another aspect of the present invention provides a system of tracking a vehicle including means for receiving vehicle information at a call center from a telematics unit via wireless network, means for determining whether the vehicle information is associated with a vehicle station identification for a missing vehicle on a vehicle tracking list and means for initiating vehicle tracking based on the determination.

A third aspect of the present invention provides computer readable medium storing a computer program including computer readable code operable to receive vehicle information at a call center from a telematics unit via a wireless network, determine whether the vehicle information is associated with a vehicle station identification for a missing vehicle on a vehicle tracking list and initiate vehicle tracking based on the determination.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
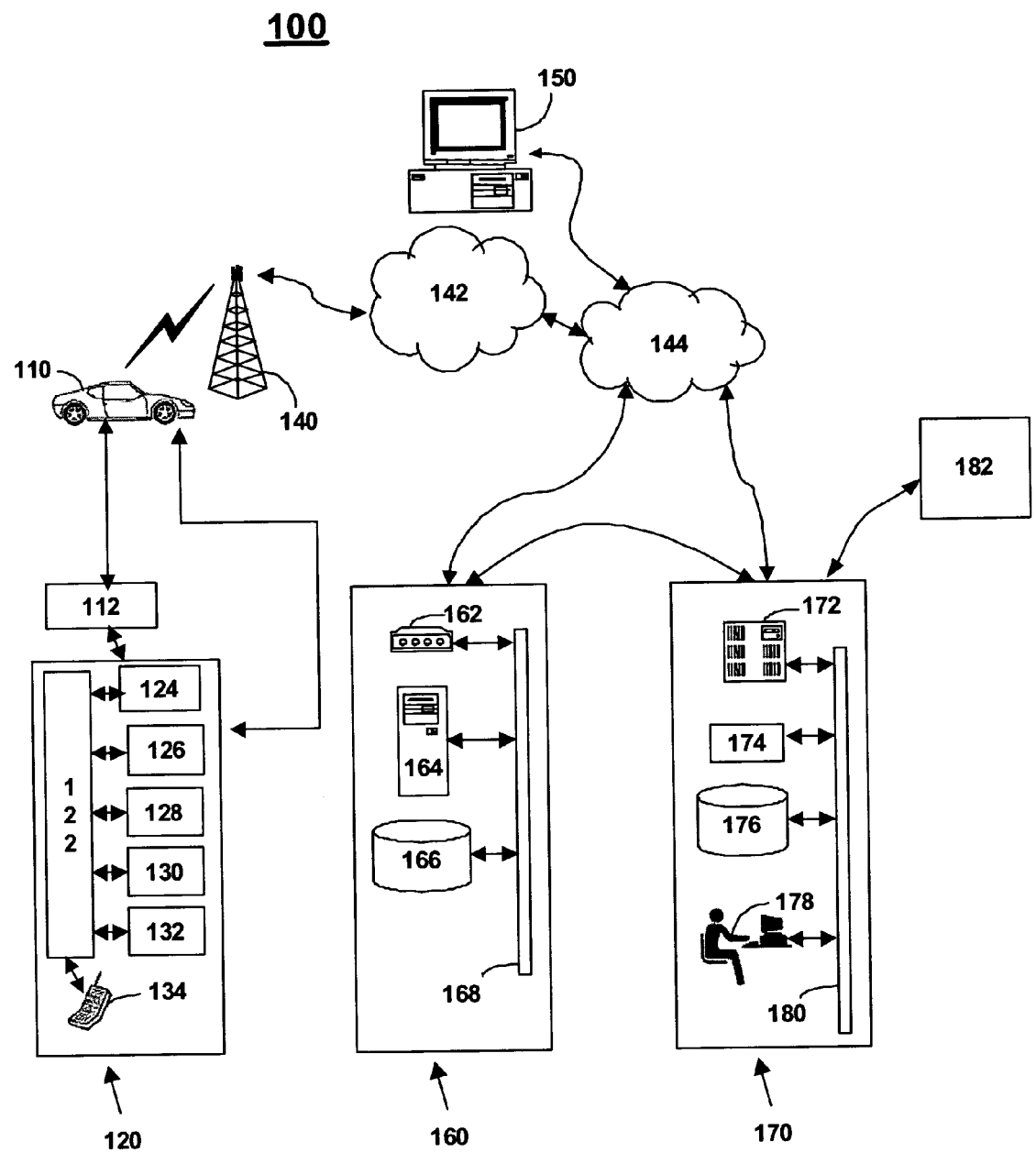
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 includes electronic modules (not shown) attached to the vehicle communication network 112. Some electronic modules include the Powertrain Control Module (PCM), Antilock Brakes System (ABS) and Instrument Panel Cluster (IPC). MVCU 110 may include additional components not relevant to the present discussion.

Vehicle communication network 112 sends signals between various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example GPS unit 126 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application is installed in processor 122 that can translate human voice input through microphone 130, to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station pre-set selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

The call center 170 communicates with a vehicle tracking system 182 to provide tracking of missing MVCUs 110. In one embodiment, the vehicle tracking system 182 is located in the call center 170. In another embodiment, the vehicle tracking system 182 includes a tracking team composed of communication services advisors 178 and a computer system with computer programmable medium including computer code to implement a tracking flow when an MVCU 110 is reported stolen or missing.

Figure 2:
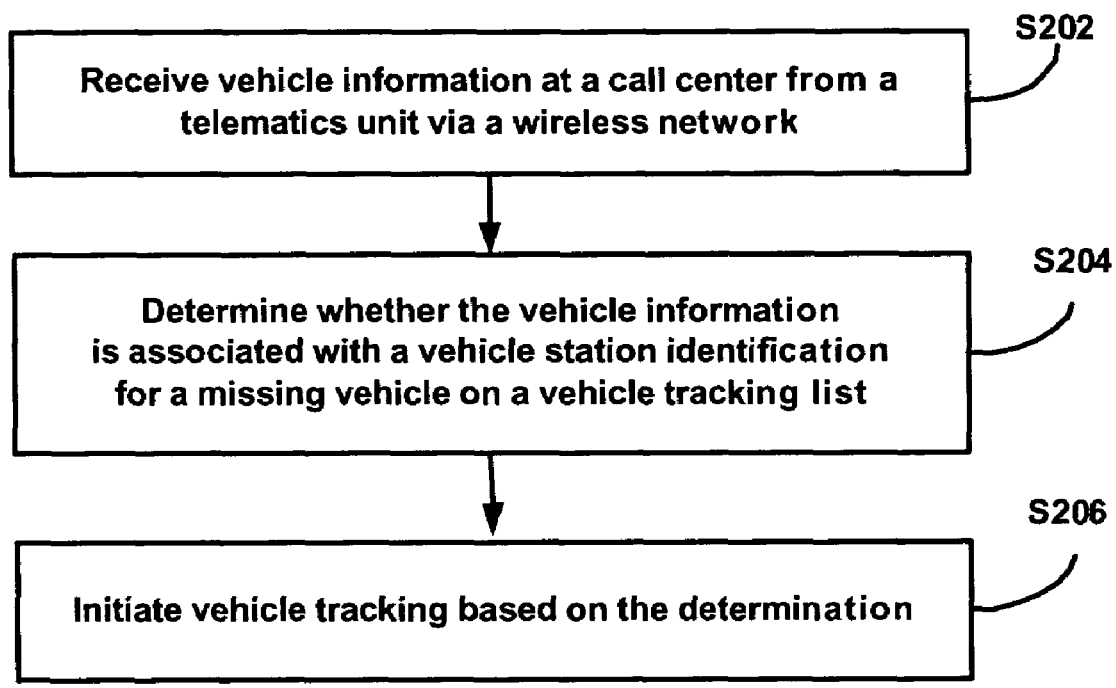
FIG. 2 illustrates a flowchart representative of a first embodiment of a method of tracking a vehicle.

FIG. 2 illustrates a flowchart 200 representative of a first embodiment of a method of tracking a vehicle. During stage S202, the call center 170 receives vehicle information from a telematics unit 120 via a wireless network. The vehicle information is received as part of a vehicle data upload request or a service request. The vehicle information includes a request-vehicle station identification to identify the MVCU 110 making the request. As the term is used herein, the vehicle station identification is the vehicle identification data that is unique for each MVCU 110. For example, vehicle identification data includes the vehicle identification number (VIN) in one embodiment. In another example, vehicle identification data includes a unique identifier assigned to the vehicle or telematics unit during the manufacture of the vehicle or telematics unit. The request-vehicle station identification is the vehicle station identification for the MVCU 110 making the request to the call center 170.

The vehicle information is transmitted from the telematics unit 120 via one or more wireless carrier systems 140, one or more communication networks 142, one or more land networks 144. An exemplary method of receiving vehicle information at a call center 170 is described below with reference to flowchart 300 of FIG. 3.

As the term is used herein, a vehicle data upload is a connection initiated by the telematics unit 120 to the call center 170, responsive to at least one trigger. A trigger is any event that has been predetermined to result in taking of predetermined actions. For example, a trigger may be traveling a certain distance, a certain number of ignition cycles, a predetermined GPS-determined location, the setting of a diagnostic trouble code (DTC), or the passage of time, such as 30 days.

During stage S204, the call center 170 determines whether the vehicle information is associated with a vehicle station identification for a missing MVCU 110 on a vehicle tracking list. The determination process includes a comparison between the received vehicle information and information on the vehicle tracking list.

A vehicle tracking list is maintained to track the identity via vehicle information of missing MVCUs. Data about a missing MVCU 110 is added to the vehicle tracking list when the MVCU 110 is reported as missing or stolen to a vehicle tracking team in the vehicle tracking system 182. When a missing MVCU 110 is located, the data about the located MVCU 110 is removed from the vehicle tracking list, in one embodiment. An exemplary method of determining if the vehicle information is associated with a vehicle station identification on a vehicle tracking list is described below with reference to flowchart 400 of FIG. 4.

During stage S206, the call center 170 initiates vehicle tracking based on the determination. If the vehicle information from the MVCU 110 making the vehicle data upload request or a service request matches a vehicle station identification on the vehicle tracking list, the call center 170 initiates vehicle tracking for the MVCU 110 making the request. An exemplary method of initiating vehicle tracking is described below with reference to flowchart 500 of FIG. 5.

Figure 3:
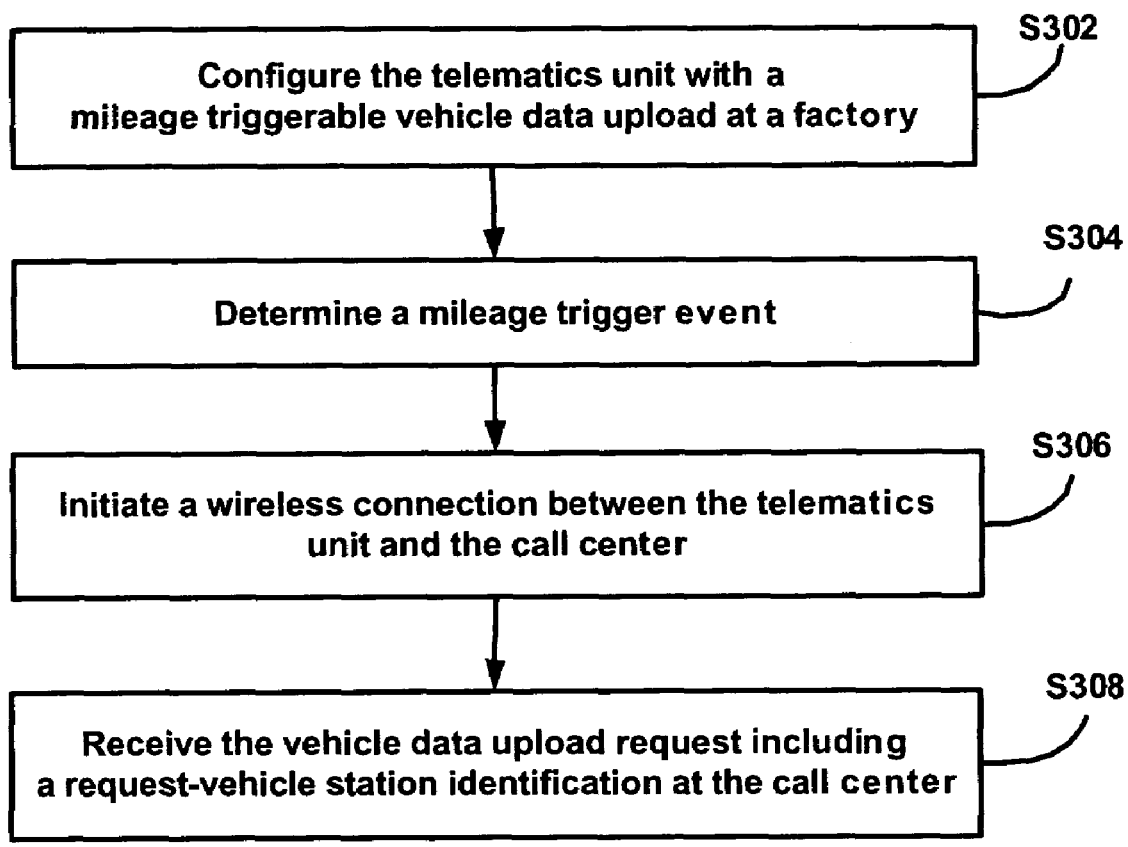
FIG. 3 illustrates a flowchart representative of a first embodiment of a method of receiving vehicle information in accordance with the present invention.

FIG. 3 illustrates a flowchart 300 representative of a first embodiment of a method of receiving vehicle information in accordance with the present invention. During stage S302, the telematics unit 120 is configured with a mileage trigger to initiate vehicle data upload during manufacture or prior to delivery to a sales lot. The mileage trigger includes a mileage trigger distance.

Although the telematics unit 120 is configured with a mileage trigger, the MCVU 110 leaving the factory is an unconfigured MCVU 110 since the hardware of the telematics unit 120 in the MCVU 110 is not configured to provide mobile vehicle communication system services. The MCVU 110 is configured in response to a transmission of instructions from the call center 170 to the telematics unit 120. The transmitted instructions are operable to activate the services of the mobile vehicle communication system 100. In one embodiment, transmission of instructions from the call center 170 to the telematics unit 120 to activate the services of the mobile vehicle communication system 100 occurs during an enrollment and activation process.

During stage S304, the telematics unit 120 in the MVCU 110 determines a mileage trigger event has occurred when the MCVU 110 is driven a distance greater than the mileage trigger distance. In one embodiment, the mileage trigger acts in response to data received from a vehicle odometer. In another embodiment, the mileage trigger acts in response to data received from wheel sensors. When the mileage trigger is reached, telematics unit 120 is triggered to call the call center 170.

During stage S306, the telematics unit 120 initiates a wireless connection between the telematics unit 120 and the call center 170 in response to the mileage trigger event. The wireless connection is operable to transmit the vehicle data upload request from the telematics unit 120 in the MVCU 110 to the call center 170. The call is made via a wireless connection over one or more wireless carrier systems 140. In one embodiment, the call is made over one or more communication networks 142, and/or one or more land networks 144. If the MVCU 110 is out of a cellular communication area when the MVCU 110 is driven a distance that equals the mileage trigger distance, the vehicle data upload request is performed once the MVCU 110 returns to the cellular area.

During stage S308, the call center 170 receives the vehicle data upload request from the telematics unit 120. The vehicle data upload includes the request-vehicle station identification of the requesting MVCU 110. In one embodiment, the vehicle data upload request is transmitted in response to a triggering of an unconfigured telematics unit 120 by the mileage trigger.

In another embodiment, the MVCU 110 is configured, as described above with reference to stage S302, and the vehicle data upload request is transmitted in response to triggering a configured telematics unit 120 with a trigger other than the mileage trigger. Other such triggers include a certain number of ignition cycles, a predetermined GPS-determined location, the setting of a diagnostic trouble code (DTC), or the passage of time, such as 30 days.

Figure 4:
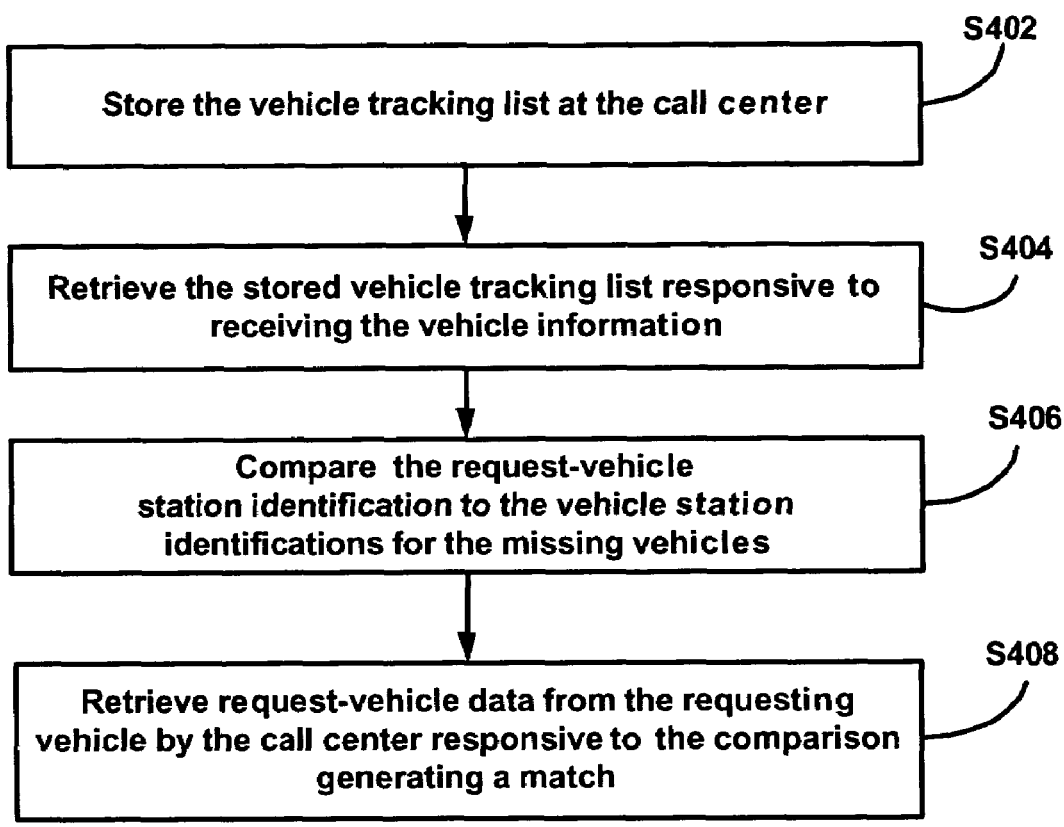
FIG. 4 illustrates a flowchart representative of a first embodiment of a method of determining an association with a vehicle station identification on a tracking list in accordance with the present invention.

FIG. 4 illustrates a flowchart 400 representative of a first embodiment of a method of determining an association with a vehicle tracking list in accordance with the present invention.

During stage S402, the call center 170 stores the vehicle tracking list in a communication services database 176. As MVCUs 110 are reported missing or stolen, the vehicle tracking system 182 updates the vehicle tracking list in the call center 170. If the vehicle tracking system 182 is external to the call center 170, the data to update the vehicle tracking list is transmitted over one or more wireless carrier systems 140, one or more communication networks 142, one or more land networks 144, one or more client, personal or user computers 150, one or more web-hosting portals 160. If the vehicle tracking system 182 is internal to the call center 170, the updated data is transmitted over one or more network systems 180, one or more client, personal or user computers 150, one or more web-hosting portals 160. In one embodiment, the vehicle tracking system 182 includes tracking team members, who are communication services advisors 178 at the call center 170.

The vehicle tracking list includes, but is not limited to, missing-vehicle data such as the vehicle station identification, VIN, the vehicle color, vehicle model type, vehicle year, name and address of vehicle owner, if any, the last known vehicle location, and the date the vehicle was reported missing or stolen.

During stage S404, the communication services manager 174 in the call center 170 retrieves the stored vehicle tracking list from the communication services database 176 responsive to receiving the vehicle information. In one embodiment, the retrieval is responsive to receiving the vehicle station identification of the MVCU 110 during the vehicle data upload request, as described above with reference to stage S306 of flowchart 300 of FIG. 3.

In another embodiment, the retrieval is responsive to receiving the vehicle station identification of the MVCU 110 during a service request. For example, the operator, authorized or unauthorized, of a configured MVCU 110 can push a button and initiate a service request to the call center 170. In this case, the operator may make the button push during a random pushing of buttons in the missing MVCU 110, not realizing that the button push initiates a service request.

During stage S406, the communication services manager 174 compares the request-vehicle station identification, which was included in the received vehicle information, to the vehicle station identifications for the missing vehicles on the vehicle tracking list. If the comparison generates a match, vehicle tracking for the matched missing MVCU 110 is initiated by the call center 170, as described below with reference to flowchart 500 of FIG. 5.

During stage S408, the call center 170 retrieves request-vehicle data from the requesting MVCU 110 responsive to the comparison generating a match between the request-vehicle station identification and the vehicle station identification for one of the missing MVCUs 110 on the vehicle tracking list. The request-vehicle data includes, but is not limited to, request-vehicle station identification, request-vehicle GPS data at the time of the request, the vehicle color, vehicle model type, the vehicle year, request-type data, vehicle mileage data, a user name, account data if the request-vehicle was configured and enrolled in the MVCS 100, and combinations thereof.

The communications services manager 174 transmits a wireless request to the telematics unit 120 for the current GPS data from the global positioning system (GPS) unit 126 and for any desired data stored in the in-vehicle memory 128. The GPS data and the other request-vehicle data are transmitted to the call center 170 over the wireless network including one or more wireless carrier systems 140. In one embodiment, the communication services advisor 178 transmits a wireless request to the telematics unit 120 for the current GPS data from the GPS unit 126 and for any desired data stored in the in-vehicle memory 128.

In one embodiment, the call center 170 continues to periodically retrieve GPS data from the requesting MVCU 110 responsive to the comparison generating a match. In one embodiment, the call center 170 retrieves GPS data every five seconds.

Figure 5:
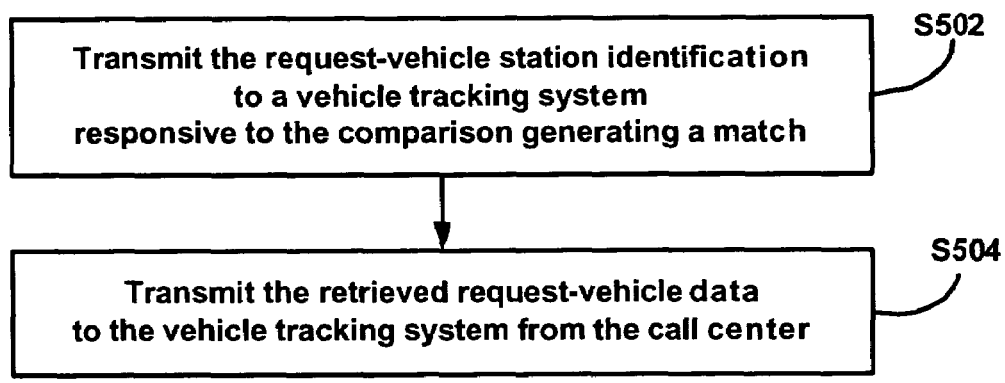
FIG. 5 illustrates a flowchart representative of a first embodiment of a method of initiating vehicle tracking in accordance with the present invention.

FIG. 5 illustrates a flowchart 500 representative of a first embodiment of a method of initiating vehicle tracking in accordance with the present invention. During stage S502, the call center 170 transmits the request-vehicle station identification to a vehicle tracking system 182 responsive to the comparison made during stage S406 in flowchart 400 of FIG. 4 generating a match. This transmitted request-vehicle station identification notifies the vehicle tracking system 182 that a communication from the missing MVCU 110 was received. In one embodiment, the call center 170 transmits the request-vehicle station identification to a vehicle tracking system 182 within one minute of the comparison generating a match.

In one embodiment, a communication services advisor 178 in the call center 170 transmits the request-vehicle station identification by initiating communication, such as placing a phone call, with an advisor on the tracking team in the vehicle tracking system 182. In another embodiment, a communication services advisor 178 in the call center 170 transmits the request-vehicle station identification to the vehicle tracking system 182 by transmitting the request-vehicle station identification to a vehicle tracking computer in the vehicle tracking system 182. In an additional embodiment, the communication services manager 174 transmits the request-vehicle station identification to the vehicle tracking system 182.

The vehicle tracking system 182 has procedures in place to be used when notification of communication from a missing MVCU 110 is received. In one embodiment, the vehicle tracking system 182 initiates vehicle tracking within one minute of receiving the request-vehicle station identification according to the operating procedures of the vehicle tracking system 182. In another embodiment, the vehicle tracking system 182 initiates vehicle tracking within five minutes of receiving the request-vehicle station identification according to the operating procedures of the vehicle tracking system 182. When vehicle tracking begins within five minutes of the receiving the request-vehicle station identification, the chance of locating the missing MVCU 110 increases.

During stage S504, the call center 170 transmits the missing-vehicle data to the vehicle tracking system 182 that was retrieved during stage S408 in flowchart 400 of FIG. 4. The tracking system 182 uses the missing vehicle data in the tracking. The GPS data can be used to notify the local law enforcement of the missing MVCU's 110 recent location.

In one embodiment, GPS data is periodically retrieved from the telematics unit by the call center 170 and sent to the vehicle tracking system 182. The vehicle tracking system 182 uses this periodically transmitted GPS data to monitor the location of the vehicle being tracked. The path that the missing MCVU 110 is being driven can be provided to the local law enforcement or other interested party.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of tracking a vehicle, the method comprising:
   receiving at a call center from a telematics unit associated with the vehicle via a wireless network at least one of a vehicle data unload request and a service request, including a request-vehicle station identification embodying vehicle information;
   determining whether the vehicle information is associated with a vehicle station identification for a missing vehicle on a vehicle tracking list; and
   initiating vehicle tracking if it is determined that the vehicle information is associated with a vehicle station identification for a missing vehicle.

2. The method of claim 1, wherein receiving a vehicle data upload request comprises:
   configuring the telematics unit with a mileage triggerable vehicle data upload at a factory, wherein the mileage triggerable vehicle data upload includes a mileage trigger distance;
   determining a mileage trigger event; and
   initiating a wireless connection between the telematics unit and the call center.

3. The method of claim 1, wherein determining whether the vehicle information is associated with a vehicle station identification for a missing vehicle on a vehicle tracking list comprises:
   storing the vehicle tracking list at the call center;

retrieving the stored vehicle tracking list responsive to receiving the vehicle information; and comparing the request-vehicle station identification to vehicle station identifications for missing vehicles.

4. The method of claim 3, wherein initiating vehicle tracking comprises:

transmitting the request-vehicle station identification to a vehicle tracking system responsive to the comparison generating a match.

5. The method of claim 3, wherein initiating vehicle tracking comprises:

retrieving request-vehicle data from the requesting vehicle by the call center responsive to the comparison generating a match.

6. The method of claim 5, further comprising:

receiving the retrieved request-vehicle data from the requesting vehicle at the call center; and transmitting the retrieved request-vehicle data to a vehicle tracking system from the call center.

7. The method of claim 5, wherein the request-vehicle data is selected from the group consisting of a request-vehicle station identification, GPS data, a vehicle color, a vehicle model type, a vehicle year, request-type data, vehicle mileage data, a user name, account data and combinations thereof.

8. A system of tracking a vehicle, the system comprising:

means for receiving vehicle information at a call Center from a telematics unit via wireless network, wherein the means for receiving vehicle information comprise:

means for configuring the telematics unit with a mileage triggerable vehicle data upload, wherein the mileage triggerable vehicle data unload includes a mileage trigger distance;

means for determining a mileage trigger event; and means for initialing a wireless connection between the telematics unit and the call center upon triggering;

means for determining whether the vehicle information is associated with a vehicle station identification for a missing vehicle on a vehicle tracking list; and means for initiating vehicle tracking based on the determination.

9. The system of claim 8, wherein the means for determining comprises:

means for storing the vehicle tracking list at the call center;

means for retrieving the stored vehicle tracking list responsive to receiving the vehicle information; and means for comparing a request-vehicle station identification to the vehicle station identifications for the missing vehicles.

10. The system of claim 9, wherein the means for initiating vehicle tracking based on the determination comprises:

means for transmitting the request-vehicle station identification to a vehicle tracking system responsive to the comparison generating a match.

11. A computer readable medium storing a computer program comprising:

computer readable code for receiving vehicle information at a call center from a telematics unit via a wireless network, wherein the computer readable code for receiving a vehicle information comprises;

computer readable code for configuring the telematics unit with a mileage triggerable vehicle data unload at a factory, wherein the mileage triggerable vehicle data unload includes a mileage trigger distance;

computer readable code for determining a mileage trigger event; and computer readable code for initiating a wireless connection between the telematics unit and the call center upon triggering;

computer readable code for determining whether the vehicle information is associated with a vehicle station identification for a missing vehicle on a vehicle tracking list; and computer readable code for initiating vehicle tracking based on the determination.

12. The medium of claim 11, wherein the received vehicle information includes a request-vehicle station identification, and wherein the computer readable code for determining comprises:

computer readable code for storing the vehicle tracking list ax the call center;

computer readable code for retrieving the stored vehicle tracking list responsive to receiving the vehicle information; and computer readable code for comparing the request-vehicle station identification to the vehicle station identifications for the missing vehicles.

13. The medium of claim 12, wherein the computer readable code for initiating vehicle tracking based on the determination comprises:

computer readable code for transmitting the request-vehicle station identification to a vehicle tracking system responsive to die comparison generating a match.

14. The medium of claim 12, wherein the computer readable code for determining further comprises:

computer readable code for retrieving request-vehicle data responsive to the comparison generating a match.

15. The medium of claim 14, wherein the computer readable code for initiating vehicle tracking based on the determination comprises:

computer readable code for receiving the retrieved request-vehicle data; and computer readable code for transmitting the received request-vehicle data to a vehicle tracking system.

16. A method of tracking a vehicle having a telematics unit, the method comprising:

receiving at a call center via a wireless network a vehicle data upload request from the telematics unit, wherein the upload request includes a request-vehicle station identification for conveying vehicle information, and wherein the telematics unit is configured with a mileage-triggerable vehicle data upload, wherein the mileage-triggerable vehicle data upload includes a mileage trigger distance, wherein a mileage trigger event has occurred, and pursuant thereto a wireless connection has been initiated between the telematics unit and the call center;

determining whether the vehicle information is associated with a vehicle station identification for a missing vehicle on a vehicle tracking list; and initiating vehicle tracking if the vehicle station identification is associated with a vehicle station identification for a missing vehicle on the vehicle tracking list.

17. The method of claim 16, wherein receiving vehicle information comprises receiving a service request including the request-vehicle station identification.

18. The method of claim 16, wherein determining whether the vehicle information is associated with a vehicle station identification for a missing vehicle comprises:

storing the vehicle tracking list at the call center;

retrieving the stored vehicle tracking list responsive to receiving the vehicle information; and comparing the request-vehicle station identification to vehicle station identifications for missing vehicles.

19. The method of claim 18, wherein the initiating vehicle tracking based on the determination comprises:
transmitting the request-vehicle station identification to a vehicle tracking system responsive to the comparison generating a match.

20. The method of claim 18, wherein initiating vehicle tracking based on the determination comprises:
retrieving request-vehicle data from the requesting vehicle by the call center responsive to the comparison generating a match.

21. The method of claim 20, further comprising:
receiving the retrieved request-vehicle data from the requesting vehicle at the call center; and
transmitting the retrieved request-vehicle data to a vehicle tracking system from the call center.

22. The method of claim 20, wherein the request-vehicle data is selected from the group consisting of a request-vehicle station identification, GPS data, a vehicle color, a vehicle model type, a vehicle year, request-type data, vehicle mileage data, a user name, account data and combinations thereof.

23. A system of tracking a vehicle having a telematics unit, the system comprising:
means for configuring the telematics unit with a mileage triggerable vehicle data upload, wherein the mileage triggerable vehicle data upload includes a mileage trigger distance;
means for determining a mileage trigger event; and
means for initiating a wireless connection between the telematics unit and a call center whereby vehicle information is transmitted to the call center from the telematics unit via a wireless network upon triggering, so that vehicle tracking is initiated if the vehicle information is associated with a missing vehicle.

* * * * *